UNITED STATES PATENT OFFICE.

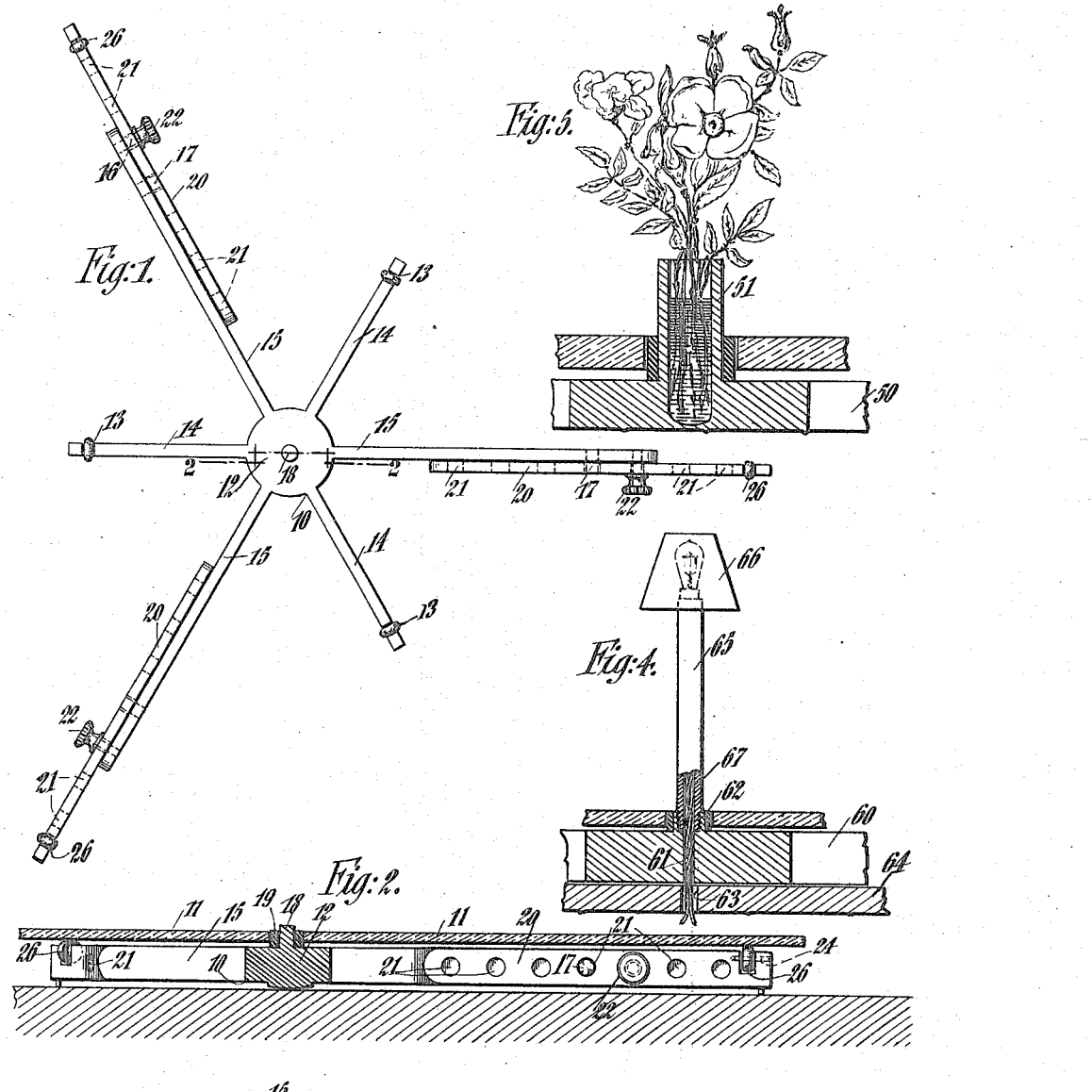

OSCAR FLEICH, OF BROOKLYN, NEW YORK.

ADJUSTABLE REVOLVING-CARRIER SUPPORT.

1,212,926.  Specification of Letters Patent.  Patented Jan. 16, 1917.

Application filed July 13, 1915. Serial No. 39,638.

*To all whom it may concern:*

Be it known that I, OSCAR FLEICH, a citizen of the United States of America, residing at Brooklyn, county of Kings, city and State of New York, have invented a new and useful Improvement in Adjustable Revolving-Carrier Supports; and I do hereby declare the following to be a full, clear, and exact description of the same.

This invention relates to an adjustable support for a revolving tray or carrier, and has for its object to provide a useful article for use on a dining table or elsewhere, to avoid the unnecessary and unsanitary handling of dishes when passing them from one person to another during a meal, and also to avoid soiling the table cloth or marring the polish of the table. The device is especially useful in serving course dinners.

To this end the device consists essentially of a support forming a suitable base adapted to rest upon the dining table and provided with adjustable arms having in their upper faces rollers adapted for receiving a revolving tray, circular glass plate or other article.

Herein I illustrate and describe in detail one of many possible embodiments of the invention, but this single embodiment is shown only by way of example and other similar devices or variations of this device may be used without departing from the spirit and scope of the invention as claimed.

In the accompanying drawing, which is for illustrative purposes only and therefore not drawn to any particular scale or proportion Figure 1 is a plan of the support of the carrier, the circular plate of glass being omitted; Fig. 2 is an elevation partly in vertical section on line 2—2 of Fig. 1; Fig. 3 is a fragmental plan partly in central horizontal section through one of the adjustable arms; and Figs. 4 and 5 are fragmental central vertical sectional views of slightly modified forms.

Referring more particularly to the drawing the device is shown comprising a support 10 on which is revolubly mounted a carrier or circular plate of glass 11 on which the dishes rest.

The base 10 comprises a hub or body portion 12 from which radially project short lateral arms 14 each provided at its outer end with an upwardly opening recess 13. Between said short arms, there are longer arms 15 radially projecting from said hub, each provided near its outer end with a laterally projecting threaded pin 16 and an unthreaded pin 17.

The hub 12 is provided at its central upper part with an upstanding lug 18 adapted to engage in a central hole in the circular glass plate 11, whereby the glass plate is held centered on the hub.

Around the lug 18 is provided a ring of rubber, felt or the like 19 for preventing noise which might be caused by friction of the revolving plate 11.

For each long arm 15 there is provided an adjustable extension 20 adapted to lie longitudinally against the side face of such long arm and each provided with a series of holes 21 adapted to receive said pins 16 and 17. On the threaded pin 16 there is provided a milled nut 22 adapted to clamp the extension and arm tightly together in any adjusted position, depending upon the size of the plate 11 or other article supported on the support.

Each extension 26 is provided at its outer end with an upwardly opening recess 23 similar to those at the outer ends of the short arms.

Longitudinally inserted in the outer end of each short arm 14 and each extension 20 is a small spindle 24 passing through each recess 13 and 23 and having at its inner end threaded engagement with the arm or extension.

Disposed within each of these recesses and rotatably mounted on said spindle is a small grooved roller 25 provided in the groove thereof with a band or tire 26 of felt, rubber or the like, adapted to engage and support the circular plate 11.

The rollers 24 may be provided with ball-bearings if desired and are practically noiseless, and since nothing touches the plate 11 except the ring 19 and tire 26, the operation of the whole device is silent.

The circular lug 18 in addition to holding centered the glass plate 11 may serve other purposes. For instance, the hub 50 of Fig. 5 is provided with an enlarged hollow lug 51 adapted to hold water and receive flowers 52 or other ornaments.

In Fig. 6 is shown a hub 60 having a central bore 61 passing entirely through hub and lug 62, while a similar bore 63 passes through the supporting table 64. On this lug 62 is mounted the stem 65 of an electric lamp 66. Wires 67 passing through said stem 65 and bores 61 and 63 supply current to the lamp.

Any suitable material or materials may be used for the construction of the device, and the device may be adapted for use with any size and style of circular plate, tray, dish or the like.

I claim as my invention:

1. A carrier comprising a hub, a plurality of arms extending radially therefrom, a roller mounted adjacent the end of each alternate arm and extending appreciably above its upper surface, a pin extending from each intermediate arm, an extension bar for each intermediate arm, and having an aperture to receive the pin of the corresponding intermediate arm, means associated with each pin for securing an extension bar to the corresponding intermediate arm, a roller mounted adjacent the free end of each extension bar, and extending appreciably above the surface thereof, and a plate resting upon said rollers and revoluble about the said hub.

2. A carrier comprising a hub, a plurality of arms extending radially therefrom, a roller mounted adjacent the free end of each alternate arm and extending appreciably above its upper surface, pins in spaced positions extending from each intermediate arm adjacent the end thereof, an extension bar for each intermediate arm, each extension bar being provided with spaced holes to receive the pins on the corresponding intermediate arm, means for securing each extension bar in any one of a number of positions to its intermediate arm, a roller mounted in the end of each extension bar and extending appreciably above its upper surface, and a revoluble plate resting upon the said rollers.

3. A carrier comprising a hub, a plurality of arms extending radially therefrom, a roller mounted adjacent the free end of each alternate arm and extending appreciably above its upper surface, pins in spaced positions extending from the said intermediate arms adjacent the ends thereof, an extension bar for each intermediate arm, each extension bar being provided with spaced holes to receive the pins on the corresponding intermediate arm, means for securing each extension bar in any one of a number of positions to its intermediate arm, a roller mounted in the end of each extension bar and extending appreciably above its upper surface, a plate resting upon the said roller, and means for centering said plate on the said hub.

4. A carrier comprising a hub, a plurality of short arms extending radially therefrom, a roller mounted adjacent the end of each short arm and extending appreciably above its upper surface, a plurality of long arms extending radially from the said hub and intermediate of the said short arms, spaced pins projecting from the said long arms adjacent the ends thereof, an extension bar for each long arm, each extension bar being provided with a series of holes adapted to receive the pins on the corresponding long arm, means coacting with one of the said pins for securing each extension bar in any one of a number of positions to its long arm, a roller mounted adjacent the free end of each extension bar and extending appreciably above the upper surface thereof, and a plate resting upon the said rollers.

5. A carrier comprising a hub, short arms projecting therefrom, a roller mounted adjacent the end of each short arm, long arms also projecting from the said hub and intermediate of the short arms, laterally projecting pins on each long arm, an extension bar for each long arm, each extension bar being provided with a series of holes adapted to receive the pins on the corresponding long arm, a nut for securing each extension bar to its long arm by engaging with one of the said pins thereon, a roller mounted adjacent the free end of each extension bar, and a plate resting upon said rollers.

6. A carrier comprising a hub, a circular lug extending upwardly from said hub in a centerly position, a ring surrounding the said lug, a plurality of short arms projecting from the said hub, a rubber tired roller mounted adjacent the end of each short arm, a corresponding number of long arms extending from the said hub in positions intermediate of the short arms, laterally projecting pins adjacent the free ends of each long arm, an extension bar for each long arm, each extension bar being provided with a series of holes adapted to receive the pins on the corresponding long arm, a nut for engaging one of the pins on each long arm to secure its extension bar in any one of a number of positions thereon, a rubber tired roller mounted adjacent the free end of each extension bar, and a circular plate resting upon the said rollers and having an aperture therein adapted to receive the said lug and ring.

In testimony whereof, I have signed my name to this specification in the presence of two subscribing witnesses.

OSCAR FLEICH.

Witnesses:
JOHN HERMANN HOVING,
CORNELIUS HOVING.

Copies of this patent may be obtained for five cents each, by addressing the "Commissioner of Patents, Washington, D. C."